United States Patent [19]

Mehnert

[11] 4,066,726
[45] Jan. 3, 1978

[54] MULTI-STAGE METHOD OF BLOW MOLDING HOLLOW SHAPED ARTICLES

[76] Inventor: Gottfried Mehnert, Messelstr. 251, Berlin 33, Germany

[21] Appl. No.: 622,020

[22] Filed: Oct. 14, 1975

Related U.S. Application Data

[63] Continuation of Ser. No. 415,806, Nov. 14, 1973, abandoned.

[30] Foreign Application Priority Data

Nov. 18, 1972 Germany .............................. 2256683
Oct. 30, 1973 Germany .............................. 2354214

[51] Int. Cl.$^2$ ............................................. B29C 17/07
[52] U.S. Cl. ......................................... 264/89; 264/98; 264/296; 425/530
[58] Field of Search ....................... 264/89, 90, 92, 94, 264/96, 99, 296; 425/326 B, 387 B, DIG. 206, DIG. 211, DIG. 213, DIG. 215, DIG. 216

[56] References Cited

U.S. PATENT DOCUMENTS

| | | | |
|---|---|---|---|
| 2,715,751 | 8/1955 | Weber | 264/97 X |
| 3,325,862 | 6/1967 | Mehnert | 264/98 X |
| 3,632,261 | 1/1972 | Gasiot et al. | 425/387 B X |
| 3,718,724 | 2/1973 | Holbmann et al. | 264/98 |
| 3,767,747 | 10/1973 | Uhlig | 264/98 X |

Primary Examiner—Jan H. Silbaugh
Attorney, Agent, or Firm—Peter K. Kontler

[57] ABSTRACT

A multi-stage blow molding method for conversion of synthetic thermoplastic parisons into hollow shaped articles includes extruding parisons at a first station, z transferring parisons from the first station to a second station (by moving the extrusion machine, by moving the parison with a gripper or by moving the parison while it is confined in the cavity of a first open-and-shut mold), converting parisons into hollow blanks or preforms at the second station, converting the blanks into shaped articles in the cavity of a second open-and-shut mold, and ejecting shaped articles from the second mold at a third station. The second mold can move between the second and third stations, or the blowing mandrel which cooperates with the first mold to convert parisons into blanks moves from the second to the third station to transfer the blanks from the second station into the second mold at the third station. In each instance, the mandrel which cooperates with the first mold to convert parisons into blanks also cooperates with the second mold to convert blanks into shaped articles.

3 Claims, 8 Drawing Figures

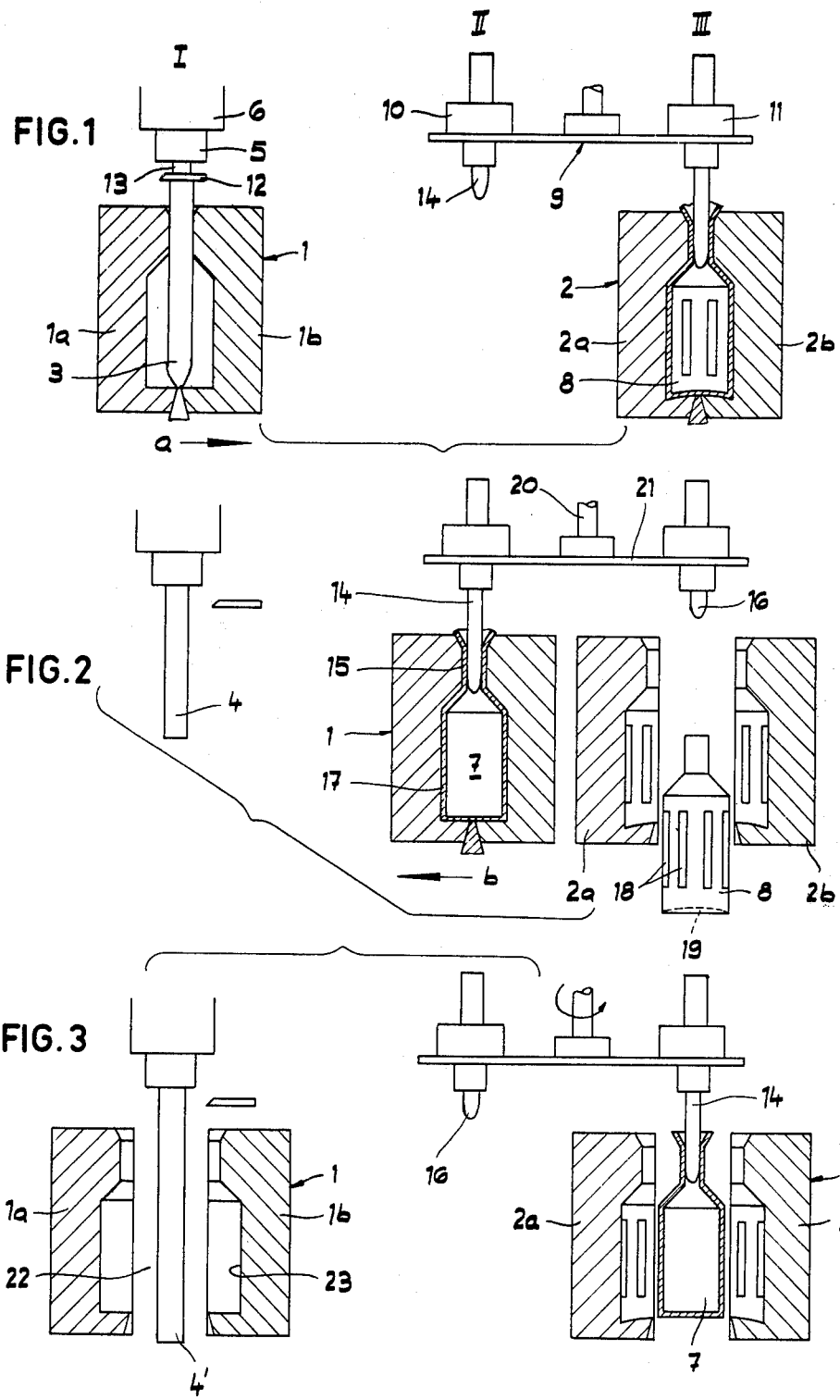

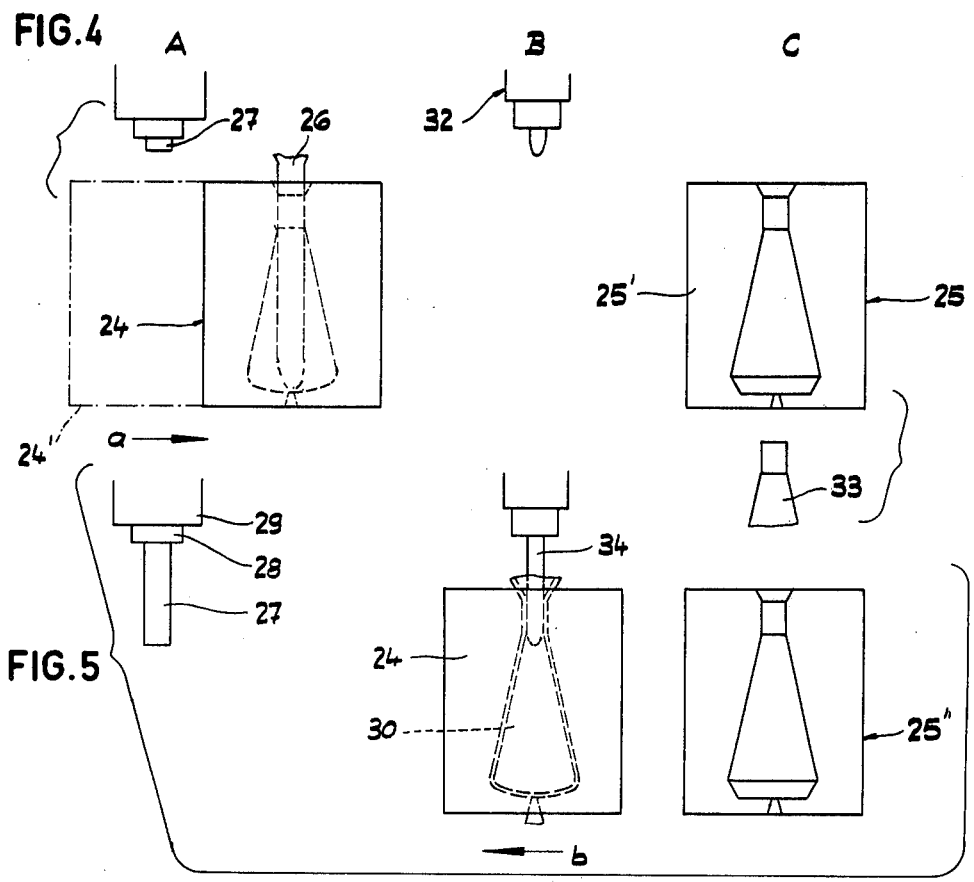
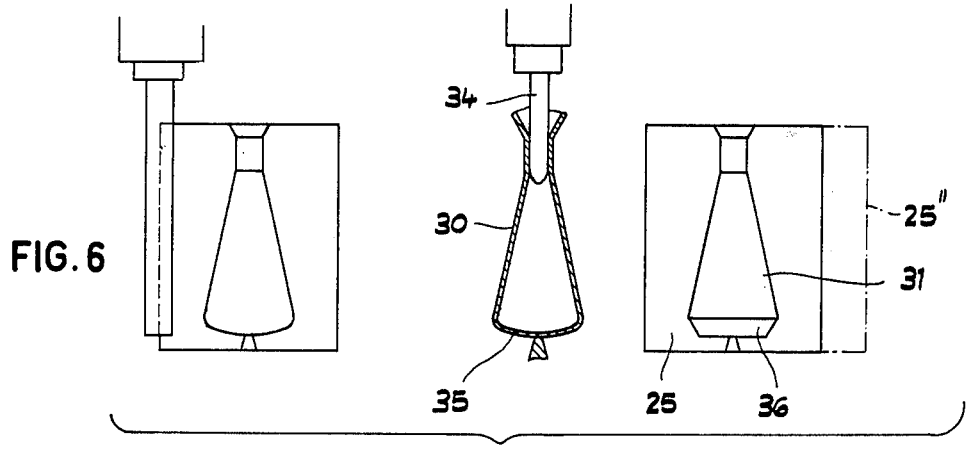

MULTI-STAGE METHOD OF BLOW MOLDING HOLLOW SHAPED ARTICLES

This is a continuation of application Ser. No. 415,806 filed Nov. 14, 1973, now abandoned.

BACKGROUND OF THE INVENTION

The present invention relates to a method of producing hollow shaped articles, such as bottles, vials, cans, other types of containers or the like, in accordance with the blow molding technique. More particularly, the invention relates to improvements in a multi-stage blow molding method according to which a plasticized parison consisting of synthetic thermoplastic material is first converted into a hollow preform or blank and the blank is thereupon converted into a hollow article of desired size and shape.

In accordance with a presently known method which involves so-called biaxial stretching of synthetic thermoplastic material, a tubular parison or a parison consisting of one or more strips of plasticized synthetic thermoplastic material is introduced into a first open-and-shut mold and is converted therein into a hollow blank or preform which resembles but is not identical with the final product. As a rule, the blank is slightly smaller than the shaped article. The blank is thereupon transferred into a second open-and-shut mold and is converted therein into a final product, i.e., a hollow shaped article having a predetermined size and shape. Reference may be had to German printed publication No. 2,161,066 or 2,164,526. The two molds are mounted on a common carrier or platen and open and close simultaneously so as to respectively allow for introduction of a parison into the first mold or the introduction of a blank into the second mold, or for removal of a blank from the first mold and removal of a shaped article from the second mold. When the extruding machine produces a parison at an extruding station, the platen with the two molds is moved in a first direction so that the open first mold receives the parison at the extruding station. The molds are then closed and the parison is separated from the leader of the plasticized material which issues from the nozzle of the extrusion machine. The platen is then moved in the opposite direction to move the first mold to a first blowing station where the parison is expanded to form a blank by resorting to a first blowing mandrel which descends into the upper end of the parison in the closed first mold. The molds are thereupon opened again and the platen is moved in the first direction to return the first mold to the extruding station where the next-following parison is ready to be separated from the extrusion machine. At the same time, the open second mold receives the blank at the first blowing station and thereupon closes with the first mold so that the first mold confines the next parison and the second mold confines the blank. The blowing mandrel at the first blowing station is withdrawn from the blank in the second mold and the platen moves in the opposite direction so as to return the first mold to the first blowing station and to locate the second mold at a second blowing station. The first mandrel penetrates into the parison in the first mold at the first blowing station and a second blowing mandrel penetrates into the blank in the second mold at the second blowing station. The mandrels then admit a suitable gaseous blowing medium so that the parison at the first blowing station is converted into a blank and the blank at the second blowing station is converted into a shaped article. The first blowing mandrel supports the blanks at the first blowing station while the platen moves in the first direction, and the shaped articles are segregated from the second mandrel at the second blowing station while the platen moves in such first direction. The opening of molds takes place when the shaped article in the second mold (at the second blowing station) is sufficiently rigid to be capable of withstanding treatment during and subsequent to transport from the second blowing station. The same cycle is then repeated again and again so that the first mandrel expands successive parisons at the first blowing station and the second mandrel expands successive blanks at the second blowing station.

The just described procedure exhibits a number of serious drawbacks. Thus, the withdrawal of first mandrel from the blank or preform at the first blowing station can result in damage to or substantial deformation of the neck portion of a blank which resembles a bottle, can, vial or a similar container. The deformation becomes even more pronounced when the neck of the blank receives the tip of the second blowing mandrel at the second blowing station. It is to be noted that the material of the blank at the first blowing station must remain in a plasticized state since the blank must undergo further deformation upon arrival at the second blowing station. The situation is further aggravated if the shaped article is to be provided with an externall or internally threaded or ribbed neck portion and/or if the neck portion is to be formed with a smooth and plane top end face in order to insure satisfactory sealing by means of a cap or the like. The wall thickness of the neck portion of a bottle normally exceeds the wall thickness of the main body portion of the bottle so that the hardening of neck portion proceeds rather slowly. This means that the first blowing mandrel is highly likely to deform the neck portion of a blank at the first blowing station, as well as that the second blowing mandrel is even more likely to again deform the neck portion during penetration into the blank at the second blowing station. It has been found that the just discussed method cannot be resorted to for the making of hollow shaped articles wherein the portions which are contacted by several discrete blowing mandrels have an accurately reproducible size and/or shape. The just discussed method is further totally unsuited for the making of bottles or analogous containers which are provided with internal threads, grooves, ridges or the like because such internal projections disappear or are deformed beyond repair during extraction of the first blowing mandrel and/or during insertion of the second blowing mandrel.

SUMMARY OF THE INVENTION

An object of the invention is to provide a novel and improved blow molding method of producing synthetic thermoplastic bottles or other types of hollow shaped articles in a plurality of stages and in such a way that the size and/or shape of each of a series of successively produced articles corresponds exactly to a predetermined norm.

Another object of the invention is to provide a multi-stage blow molding method which can be carried out by resorting to blow molding apparatus which constitute relatively minor modifications of conventional blow molding apparatus.

A further object of the invention is to provide a multi-stage blow molding method which is particularly suited for the mass-production of plastic bottles or the like and insures that the portions which are being contacted by blowing mandrels do not undergo any or undergo negligible deformation.

An additional object of the invention is to provide a blow molding method which can be used with advantage for the making of shaped articles having externally and/or internally grooved, threaded, ribbed or similarly configurated neck portions.

Still another object of the invention is to provide a multi-stage blow molding method of making plastic bottles or analogous hollow shaped articles wherein the surfaces surrounding the openings of the articles are configurated with a view to insure a highly satisfactory sealing by means of bungs, caps or the like.

The improved method is employed for conversion of plasticized synthetic thermoplastic parisons into hollow shaped articles in a plurality of stages and comprises the steps of forming a succession of parisons in an extrusion machine at a first or extruding station, transferring parisons from the first station to a second station, converting parisons at the second station into hollow preforms or blanks including introducing into the parisons a blowing mandrel and expanding the parisons in the cavity of a first open-and-shut mold, converting the blanks into shaped articles including confining the blanks in the cavity of a second open-and-shut mold while the blanks remain attached to and receive a gaseous blowing medium from the blowing mandrel, and ejecting the shaped articles from the second mold at a third station. The step of converting blanks into shaped articles further comprises moving the second mold or the mandrel between the second and third stations, i.e., the second mold can receive and confine the blank at the second station if the mandrel cannot move between the second and third stations, or the mandrel moves between the second and third stations if the second mold is fixedly mounted at the third station.

The transfer of parisons from the first to the second station may take place by moving the first mold from the second station to the first station and back to the second station, by moving the extrusion machine from the first station to the second station (if the first mold is fixedly mounted at the second station), or by moving the parisons by means of tongs, grippers or the like between a stationary extrusion machine at the first station and a fixedly mounted first mold at the second station.

If the first mold is movable between the first and second stations and the second mold is movable between the second and third stations (i.e., if the blowing mandrel is located at the second station), the movements of the first mold to and from the first station preferably take place simultaneously with movements of the second mold to and from the second station. The configuration and/or dimensions of the blanks may deviate only slightly from the configuration and/or dimensions of shaped articles.

The novel features which are considered as characteristic of the invention are set forth in particular in the appended claims. The improved blow molding method itself, however, together with additional features and advantages thereof, will be best understood upon perusal of the following detailed description of certain specific embodiments of apparatus which can be utilized for the practice of the method.

BRIEF DESCRIPTION OF THE DRAWING

FIG. 1 is a fragmentary schematic elevational view of an apparatus wherein the first mold is movable between the extruding station and the first blowing station and the blowing mandrel serves to transfer blanks from the first blosing station into the second mold at the second blowing station, the first mold being located at the extruding station and the second mold being shown in closed position;

FIG. 2 illustrates the structure of FIG. 1 but with the first mold located at the first blowing station and with the second mold in open position;

FIG. 3 illustrates the structure of FIG. 2 but with the first mold back at the extruding station and the second mold ready to receive a freshly formed blank;

FIG. 4 is a fragmentary schematic elevational view of a second apparatus wherein the blowing mandrel cannot leave the first blowing station and the first and second molds are respectively movable between the extruding station and first blowing station and the first and second blowing stations;

FIG. 5 illustrates the structure of FIG. 4 but with the first mold located at the first blowing station;

FIG. 6 illustrates the structure of FIG. 5 but with the first mold on its way toward the extruding station;

DESCRIPTION OF THE PREFERRED EMBODIMENTS

Figure 7:
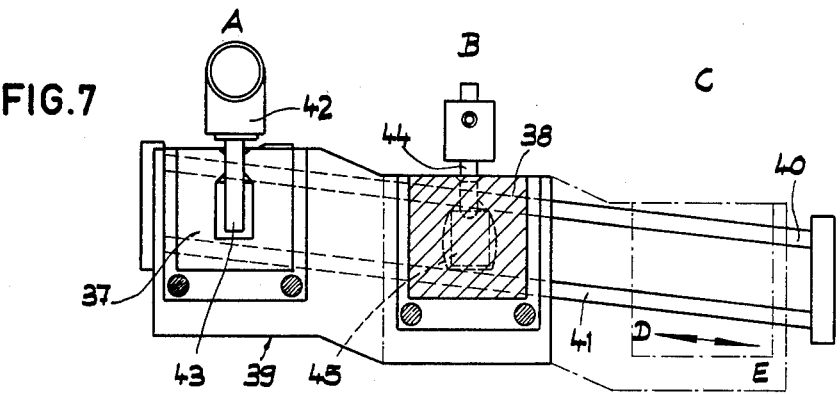
FIG. 7 is a fragmentary elevational view of an apparatus which constitutes a modification of the apparatus shown in FIGS. 4 to 6.

Referring first to FIGS. 1 to 3, there is shown a blow molding apparatus wherein an extrusion machine 6 having an extrusion nozzle 5 is installed at a first station or extruding station I, a first open-and-shut mold 1 is movable back and forth between the extruding station I and a second station or first blowing station II, and a second open-and-shut mold 2 is installed at a third station or second blowing station or ejecting station III. The molds 1 and 2 respectively comprise sections 1a, 1b and 2a, 2b which are movable toward and away from each other during certain stages of operation of the apparatus. The nozzle 5 of the extrusion machine 6 produces a continuous tube 4 (see FIG. 2) which consists of a plasticized synthetic plastic material and is severed at regular intervals by a suitable severing device 12 to yield a succession of elongated tubular parisons 3. A hollow blank is shown in FIGS. 2 and 3, as at 7, and a finished hollow shaped article is shown in FIGS. 1 and 2, as at 8. The apparatus further comprises a blowing and calibrating unit 9 including a vertical shaft 20 which supports a pivotable or turnable carrier 21 for two parallel upright blowing mandrels 14 and 16. The mandrel 14 forms part of a first blowing aggregate 10 and the mandrel 16 forms part of a second blowing aggregate 11.

The reference character 13 denotes in FIG. 1 the leader of the tube 4 immediately behind a freshly severed parison 3.

In FIG. 1, the first mold 1 is located at the extruding station I and its sections 1a, 1b are closed so that the cavity 23 of the mold 1 confines the parison 3. As shown, the lower portions of the mold sections 1a, 1b can pinch the lower end of the parison 3 so that the latter is sealed at such lower end. The severing device 12 is in the process of separating the parison 3 from the leader 13 of the tube 4 which issues from the orifice of the extrusion nozzle 5. As soon as the parison 3 is completely separated from the leader 13, the closed mold 1 is rapidly advanced in the direction indicated by arrow $a$ so as to transfer the parison to the second station II. The mandrel 14 is held at the station II in retracted or raised position and is caused to descend so that its tip penetrates into the open upper end of the parison 3 in the cavity 23 (see FIG. 2). The aggregate 10 is then caused to admit into the parison 3 a blast of a compressed gaseous blowing medium which expands the parison 3 so that the latter is converted into a hollow preform or blank 7 whose outline follows at least substantially the outline of the surface surrounding the cavity 23 of the closed mold 1. At the same time, a finished shaped article 8 is confined in the cavity of the closed second mold 2 at the third station III and is being subjected to the last phase of an intensive cooling action so as to readily withstand treatment to which it is to be subjected subsequent to removal or ejection from the mold 2.

As the tip of the mandrel 14 penetrates into the open upper end of the parison 3 at the station II, it cooperates with the adjacent portions of the mold sections 1$a$, 1$b$ to form and calibrate the neck portion 15 of the blank 7. This blank 7 is assumed to constitute the preform of a plastic bottle and it will be noted that the main portion 17 of the blank 7 already closely resembles the main portion of a shaped article 8.

At the third station III, the mandrel 16 extends into the neck portion of the shaped article 8 in the closed mold 2 and is retracted shortly before, while or shortly after the mold 2 opens (compare FIGS. 1 and 2). The retraction of mandrel 16 to the position shown in FIG. 2 may result in separation of the shaped article 8 from the mandrel 16 whereby the article 8 descends by gravity onto a suitable conveyor (not shown) for transport to a further processing station, e.g., to a station where the article 8 is provided with printed matter and/or labels, to a filling station where the article 8 receives a liquid or solid material, or to storage. The shaped article 8 differs from a blank 7 in that its main body portion is formed with projections or ribs 18 and that its bottom wall 19 has a concave underside.

When the conversion of a parison 3 into a blank 7 at the station II is completed, the mold 1 opens and returns to the station I by moving in the direction indicated by arrow $b$ shown in FIG. 2. The carrier 21 of the blowing and calibrating unit 9 is then rotated through 180 degrees so that the blank 7 on the mandrel 14 is transferred into the space between the sections 2$a$, 2$b$ of the open mold 2 at the station III and the mandrel 16 moves to the station II so as to be ready to penetrate into the parison which is about to be transferred from the station I. The machine 6 has extruded a further length 4' of a plasticized tube (see FIG. 3) by the time the open mold 1 reaches the station 1 and the tube 4' is located in the space 22 between the sections 1$a$, 1$b$ so that the mold 1 can close around the tube 4' before the latter is severed by the device 12. The mold 1 then transfers the thus obtained parison to the station II where the mandrel 16 descends and penetrates into the open upper end of the parison prior to admitting into the parison a blast of a compressed gaseous blowing medium. The mold 2 also closes and the mandrel 14 admits blowing medium into the blank 7 which is suspended thereon so that the blank 7 is converted into a further shaped article 8. The just described procedure is repeated again and again, i.e., parisons are being transferred from the station I to the station II, such parisons are converted into blanks at the station II, the blanks are thereupon transferred to the station III and the blanks are converted into shaped articles in the cavity of the mold 2.

It will be noted that the apparatus of FIGS. 1 to 3 is illustrated very schematically. Thus, the mold 1 is actually turned through 90 degrees with respect to the position shown in FIGS. 1 to 3 since, otherwise, its section 1$a$ would strike against the growing tube 4 or 4' during movement of the mold 1 in the direction indicated by arrow $b$. If desired, the mold 1 can be oriented in a manner as shown in FIGS. 1 to 3; however, the movement of the mold 1 between the stations I and II then takes place along an arcuate path so that the mold enters the station I by moving substantially at right angles to the plane of FIG. 1, 2 or 3.

It is further clear that the apparatus of FIGS. 1 to 3 can operate with a single blowing mandrel. For example, and assuming that the mandrel 16 is omitted, the mandrel 14 can transfer blanks 7 from the station II to the station III where it cooperates with the mold 2 to convert blanks 7 into shaped articles 8, and the mandrel 14 thereupon returns to the station II just in time to penetrate into a fresh parison in the mold 1. However, the provision of a blowing and calibrating unit 9 with two mandrels is preferred at this time because one mandrel can cooperate with the mold 1 at the station II to form a blank 7 while the other mandrel is being withdrawn from a shaped article 8 at the station III.

If the space which is available for mounting of the blow molding apparatus is such that there is no room for pivoting or turning of aggregates 10, 11 about a vertical axis (shaft 20), the unit 9 can be replaced with a unit wherein the mandrel or mandrels are arranged to orbit about a horizontal axis. The mandrels are then mounted in such a way that they remain in upright position during transport between the stations II and III. The just discussed modification of the apparatus is desirable when the apparatus is installed in a hall or the like with unobstructed space above the level of the molds 1 and 2. To insure that the mandrels which are arranged to orbit about a horizontal axis will remain in upright position, at least while they transport blanks 7 between the stations II and III, the blowing and calibrating unit may embody a suitable parallel motion mechanism of any known design. If the blowing and calibrating unit employs a single blowing mandrel, such mandrel can be moved back and forth along a straight path; the molds 1 and 2 are then mounted in such a way that their sections 1$a$, 1$b$ and 2$a$, 2$b$ are movable at right angles to the plane of FIG. 1, 2 or 3.

An important advantage of the method which can be practiced by resorting to the apparatus of FIGS. 1 to 3 or to the just described modifications of this apparatus is that the conversion of a parison into a blank takes place by using a blowing mandrel which remains in the blank during transfer of the blank to the third station and during conversion of the blank into a shaped article. This reduces the likelihood of deformation of blanks and/or shaped articles, especially in the region of the neck portion.

Another important advantage of the method is that the conversion of blanks into shaped articles can take longer than the conversion of parisons into blanks. This is achieved by the simple expedient of providing the apparatus with means for opening and closing the mold 1 independently of the opening and closing of mold 2, and vice versa. The apparatus of FIGS. 1 to 3 comprises two main components which are movable between two stations, i.e., the mold 1 which is reciprocable or otherwise movable between the stations I and II to transfer parisons from the station I to the station II, and the blowing mandrel or mandrels which are movable between the stations II and III in order to transport blanks from the station II to the station III. Each of the main components which are movable between neighboring stations can be mounted for movement along a straight, arcuate, horizontal, vertical or inclined path.

The second mold 2 remains closed as long as is necessary to insure that the material of an article 8 hardens to the extent which is required to avoid undesirable deformation or distortion of the article during extraction of the mandrel from the neck portion and/or during subsequent processing of the article. It has been found that the utilization of a blowing mandrel for conversion of parisons into blanks as well as for conversion of blanks into shaped articles greatly reduces the likelihood of undesirable deformation so that the dimensions of successively produced shaped articles deviate only negligibly from a predetermined norm.

The apparatus of FIGS. 1 to 3 can be assembled of known components, i.e., such apparatus can be obtained by a relatively simple conversion of conventional blow molding apparatus which employ several open-and-shut molds. All that is necessary is to change the setup so that the blowing mandrel or mandrels can be moved between the station for the making of blanks and the station for the making and ejection of shaped articles, and that the mold which is used for the making of blanks is movable between a blowing station and an extruding station. In other words, the apparatus of FIGS. 1 to 3 can be assembled by a simple change in the setup of presently known and existing apparatus for the making of shaped articles by resorting to the blow molding technique.

As mentioned above, the dimensions of the blanks 7 need not deviate substantially from the dimensions of shaped articles 8. In fact, it is often desirable to construct the molds 1 and 2 in such a way that the dimensions of a blank 7 deviate only negligibly (e.g., by a small fraction of one millimeter) from the dimensions of the shaped article 8. Such mode of producing hollow shaped articles exhibits many advantages. Thus, it has been found that, when a parison is being expanded to form a blank, at least some air remains entrapped in the cavity of the mold so that the outline of the blank cannot follow exactly the surfaces which surround the mold cavity. This is attributed to the fact that, as a rule, the sections of the mold (such as the sections 1a and 1b of the mold 1 in FIG. 1) are normally machined with a high degree of precision so that they can form a cavity (23) which is practically completely sealed from the surrounding atmosphere whenever the mold is held in closed position. The combined volume of all cushions of air which remains entrapped in the mold during conversion of a parison into a blank depends on the finish of the abutting surfaces of the mold sections and also on the dimensions of the mold cavity as well as on the configuration of the blank. The entrapped air not only influences the finish of the external surface of the blank but also the configuration of the blank and particularly the exchange of heat between the mold sections and the material of the blank. Such air constitutes an insulating layer which may have a thickness ranging from one or more tenths of one millimeter and up to 10 millimeters, depending on the size of the blank. An air cushion having a thickness in the range of several millimeters will develop in molds for the making of blanks which are to be converted into extremely large cans or other types of containers. The insulating layer greatly reduces the exchange of heat between the material of a blank and the mold sections. It will be readily appreciated that a blank whose material is not satisfactorily cooled due to development of air cushions between its external surface and the internal surfaces of the mold sections is even more likely to undergo substantial deformation if the mandrel which is used for the making of blanks must be withdrawn and a second mandrel inserted for conversion of the blank into a shaped article. The method of the present invention insures that eventual unsatisfactory cooling of blanks does not result in excessive deformation of blanks because the mandrel which is used at the station II is also used at the station III, i.e., once inserted into a parison, the mandrel remains attached thereto during the entire cycle of a multi-stage conversion of a parison into a shaped article. Unsatisfactory cooling of blanks can also affect certain other characteristics of the thermoplastic material. Thus, it is known that improper cooling of a blown article affects it transparency or light transmissivity, i.e., the transparency or translucency improves with improved cooling of articles.

If the molds 1 and 2 are designed in such a way that the dimensions of the blanks 7 deviate only slightly or negligibly from the dimensions of the shaped articles 8, the likelihood of formation of substantial cushions or pockets of air in the cavity of the mold 2 is greatly reduced because nearly all of the air is expelled from the mold 2 during movement of sections 2a, 2b toward each other to confine a blank 7 therein. In fact, the dimensions of the cavity in the mold 2 may be identical with the dimensions of the cavity 23 in the mold 1; the conversion of a blank 7 into a shaped article 8 then merely involves an expansion of blank 7 to the extent which is needed in view of entrapment of some air in the mold 1 while the mold 1 is closed and the mandrel 14 or 16 admits a blowing medium. This almost invariably insures that the dimensions of shaped articles 8 conform to a predetermined norm. The minute quantities of air which might remain entrapped in the mold 2 when the latter closes can be readily expelled through the gap or gaps between the mold sections 2a and 2b while the mandrel 14 or 16 admits a blowing medium into the blank 7 in the cavity of the mold 2.

FIGS. 4 to 6 illustrate a second apparatus wherein a blowing and calibrating unit 32 is fixedly mounted at a first blowing station B and comprises a mandrel 34 which is movable up and down to penetrate into a parison 26 or to be withdrawn from a hollow shaped article 33. The extruding station is shown at A, and an ejecting or third station is shown at C. The extrusion machine 29 at the station A includes a nozzle 28 which furnishes a continuous tube 27. The severing device which subdivides the tube 27 into discrete parisons 26 is not shown in FIGS. 4 to 6.

A first mold 24 is movable from the station B to the station A (arrow b) to receive a fresh parison 26 and to thereupon transfer such parison to the station B (arrow a), and a second mold 25 is movable from the station C to the station B where it cooperates with the mandrel 34 to convert a blank 30 into a shaped article 33 before returning to the station C where the article 33 is ejected. The cavity 31 of the second mold 25 confines a blank 30 while the mold 25 closes around the blank at the station B, and the mandrel 34 is retracted from the shaped article 33 at the station B when the material of the neck portion of the article is sufficiently rigid to allow for extraction of the mandrel without any danger of undesirable deformation. The mold 25 then moves to the station C where it opens to allow for ejection of the article 33.

The sections of the molds 24, 25 are movable toward and away from each other at right angles to the plane of FIGS. 4–6, i.e., each of FIGS. 4–6 merely shows one section 25' of the mold 25 and FIG. 6 merely shows one section of the mold 24. The position of the mold 24 at the station A is shown at 24', and the position of the mold 25 at the station C is shown at 25''. In FIG. 4, the mold 24 is in the process of moving (arrow *a*) from the position 24' toward the station B so as to transfer a fresh parison 26 into register with the mandrel 34. The mold 25 can open at the station C while the mold 24 moves toward the station B so that a freshly cooled shaped article 33 can be expelled from the cavity 31.

In FIG. 5, the mold 24 is located at the station B and the mandrel 34 assumes its lower end position in which it extends into the neck portion of the blank 30. The mold 25 is still open (in the position 25'' at the station C). The tube 27 at the station A grows gradually to reach a length which suffices to separate a full-sized parison 26 (see FIG. 6) not later than when the mold 24 returns to the position 24'.

The mold 24 at the station B opens immediately or shortly upon completion of conversion of a parison 26 into a blank 30, and the mold 24 then advances (arrow *b*) toward the station A in order to receive and transfer the next parison. The blank 30 remains suspended on the mandrel 34 while the mold 25 travels from the station C toward the station B to receive the freshly formed blank 30. Such blank is then expanded by gas which is supplied via mandrel 34 and the mandrel is retracted as soon as the neck portion of the shaped article 33 can withstand such extraction without undue deformation. It will be noted that the blank 30 closely resembles a shaped article 33. The main difference is that the rounded bottom wall 35 of the blank 30 is converted into a frustoconical bottom wall 36 of the article 33.

The main difference between the apparatus of FIGS. 1–3 and 4–6 is that the latter apparatus employs a single blowing mandrel 34 which cannot leave the station B. Therefore, the mold 24 is reciprocable between the stations A and B to transfer parisons 26 from the extrusion machine 29 into register with the mandrel 34 and to thereupon cooperate with the mandrel 34 in converting the parison 26 into a blank 30. The mold 25 reciprocates between the stations B and C in order to cooperate with the mandrel 34 at the station B in converting a blank 30 into a shaped article 33 and to thereupon transfer the article 33 to the station C before the article is caused or allowed to leave the cavity 31.

FIG. 7 illustrates a third apparatus which constitutes a modification of the apparatus shown in FIGS. 4 to 6. The molds 37 and 38 are mounted on a common support or frame 39 which is reciprocable along inclined tie rods 40, 41 or analogous guide means so as to move the first mold 37 between the stations A, B and to simultaneously move the second mold 38 between the stations B, C. The station A is an extruding station, the station B is a blowing station, and the station C is an ejecting station, the same as in FIGS. 4 to 6. Since the molds 37, 38 are mounted on a common support 39, the distance between the stations A, B must equal the distance between the stations B, C. The directions in which the frame 39 is reciprocable are indicated by arrows D and E. The extrusion machine is shown at 42, a plasticized tube at 43, the single blowing mandrel at 44, and a shaped article at 45. The apparatus of FIG. 7 further comprises means (not specifically shown) for opening and closing the mold 37 independently of the mold 38, and vice versa. This renders it possible to open the mold 37 immediately or shortly after conversion of a parison into a hollow blank while the mold 38 continues to remain in closed position until the shaped article 45 therein hardens sufficiently to permit transport and/or other processing without excessive deformation. The provision of discrete and independent opening and closing means for the molds 37, 38 is further desirable because the apparatus can be operated in such a way that the mold 37 begins to move toward the station A before the machine 42 extrudes a tube 43 of requisite length. This enables the mold 38 to reach the station B and to close around a freshly formed blank even before the mold 37 receives a parison at the station A. The mold 37 simply remains open while the extrusion of the tube 43 continues but the mold 38 already confines a shaped article 45 which has ample time to set before the mandrel 44 is retracted so that the mold 38 can be transferred to the station C where the cooling of the article 45 may continue. The shaped article 45 in the mold 38 at the station B should be allowed to cool to the extent which is needed to allow for extraction of the mandrel 44; any further cooling and hardening of the article 45 can take place at the station C and/or during transport from the station B to the station C.

Figure 8:
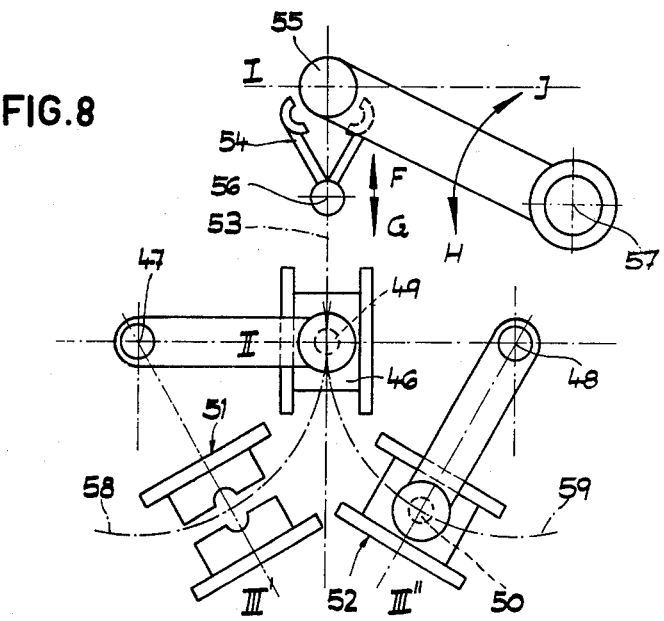
FIG. 8 is a schematic plan view of an apparatus with several second molds and with means for transferring parisons from the extruding station to the first mold at the first blowing station.

FIG. 8 illustrates a further blow molding apparatus which comprises a first mold 46 permanently installed at a first blowing station II and two second molds 51, 52 which are installed at discrete second blowing stations III' and III''. Since the molds 46, 51, 52 cannot move between various stations, the apparatus of FIG. 8 comprises means for transferring parisons from an extrusion machine 55 at a station I to the mold 46 at the station II and means for transferring hollow blanks from the station II to the stations III' and III''.

In accordance with a first embodiment, the extrusion machine 55 is mounted on an elongated arm which is pivotable at 57 (see the arrows H and J) so that a tube which is being extruded through the nozzle of the machine 55 can be moved into the space between the sections of the mold 46 at the station II. Thus, the parisons can travel to the mold 46 to be thereupon converted in the mold 46 into hollow blanks which are ready for transfer into the mold 51 or 52. The apparatus of FIG. 8 is used when the extrusion machine 55 can furnish parisons at the rate which is needed to meet the requirements of several second molds or when the nature of the plastic material and/or the dimensions of the shaped articles are such that the cooling of articles in the cavities of the second molds takes up a relatively long interval of time.

Instead of using a pivotable or otherwise movable extrusion machine, the apparatus of FIG. 8 may employ a gripper or tongs 54 which is pivotable at 56 and can serve to transfer parisons from the extrusion machine 55 (which is then fixedly mounted at the station I) to the mold 46 at the station II. The pivot 56 for the tongs 54 is assumed to be reciprocable along a straight path 53 (see the arrows F and G), i.e., the transfer of a parison from the machine 55 into the mold 46 involves a pivoting of the tongs 54 about the axis of the pivot 56 and a sidewise movement of the pivot 56 in the direction indicated by arrow G.

The means for transferring hollow blanks from the mold 46 at the station II to the molds 51, 52 at the stations III' and III'' comprises two discrete mandrels 49, 50 which are mounted on elongated arms pivotable at 47 and 48. The mandrel 49 is movable back and forth or can orbit along an arcuate path 58 to deliver hollow blanks from the mold 46 to the mold 51, and the mandrel 50 is movable back and forth or can orbit along an arcuate path 59 in order to deliver hollow blanks from the mold 46 to the mold 52.

The tongs 54 may be omitted and the extrusion machine 55 can be fixedly mounted at the station I if the mold 46 is movable between the stations I and II in the same way as described in connection with FIGS. 1–7. The tongs 54 can be used with a pivotable extrusion machine 55 and with a reciprocable mold 46; the tongs 54 is then moved out of the way if the parisons are being transferred by the machine 55 or by the mold 46, the machine 55 is arrested at the station I if the parisons are being transferred by the mold 46 or tongs 54, and the mold 46 is fixedly mounted at the station II if the parisons are being transferred by the tongs 54 or by the machine 55.

It is further clear that the molds 51 and 52 can be mounted nearer to or further away from the station II, and also that the distance between the stations II and III' need not equal the distance between the stations II and III''. For example, the molds 51 and 52 can be mounted in six o'clock positions with respect to the pivots 47 and 48. Still further, the supports for the blowing mandrels 49 and 50 can perform more complex movements, such as an orbital movement which takes place simultaneously with a movement toward or away from the axis of the respective pivot 47 or 48.

The apparatus of FIG. 8 may comprise two or more mandrels 49 for transfer of blanks from the station II to the station III', and two or more mandrels 50 for the transfer of blanks from the station II to the station III''. Thus, two or more mandrels 49 can orbit about the axis of the pivot 47 to transfer blanks from the mold 46 to the mold 51 alternatingly with the transfer of blanks from the mold 46 to the mold 52 by means of two or more mandrels 50 which orbit about the axis of the pivot 48. A mandrel 49 or 50 which transfers blanks from the mold 46 to the mold 51 or 52 can continue to support the respective shaped article upon opening of the mold 51 or 52 whereby such shaped article is transferred to one or more additional stations which are adjacent to the path 58 or 59 downstream of the station III' or III''. Such additional stations may accommodate cooling, imprinting, labelling, ejecting and/or other instrumentalities.

An advantage of the apparatus which is shown in FIG. 8 is that the cooling of shaped articles in the molds 51, 52 or at stations which are located downstream of the stations III' and III'' can take much longer than in the apparatus of FIGS. 1–7. It is well known that the length of a complete cycle of multistage blowing of hollow shaped articles is determined mainly by the length of the interval which is required for cooling of the final product. Such cooling can be selected at will if the apparatus of FIG. 8 comprises two or more second molds so that the blanks which are formed in the mold 46 can be converted into shaped articles which remain in the respective second molds as long as necessary (e.g., twice, three times, four times, etc. as long as the period of dwell of blanks in the mold 46), depending only on the number of second molds which can be increased to three, four or more. The use of two or more second molds (for the conversion of blanks into shaped articles) is especially desirable when the apparatus is designed for the making of large shaped articles and/or for the making of thick-walled articles so that the cooling of plastic material in the cavities of the second molds takes up relatively long intervals of time. In such apparatus, the interval which is required for the cooling of a shaped article may greatly exceed the sum of intervals which are required for transfer of parisons from the first to the second station, for conversion of parisons into blanks and for conversion of blanks into shaped articles.

It is further clear that the apparatus shown in FIGS. 1–3, 4–6 and/or 7 can also comprise two or more second molds. For example, and referring first to FIGS. 1 to 3, the extrusion machine 6 can supply parisons to a mold 1 which converts parisons into blanks 7 for conversion into shaped articles at two or more second blowing stations III. All that is necessary is to redesign the blowing and calibrating unit 9 so that its mandrels can transport hollow blanks 7 to two or more molds 2. It is further possible to modify the apparatus of FIGS. 1 to 3 by using an additional mold 1 and an additional mold 2. The additional molds 1 and 2 are then mounted at stations which are mirror symmetrical to the stations II and III with reference to a plane which is normal to the plane of FIG. 1, 2 or 3 and passes through the axis of the extrusion nozzle 5. The additional mold 1 receives each first, third, fifth, etc. parison and the mold 1 of FIGS. 1 to 3 receives each second, fourth, sixth, etc. parison. Such apparatus will be used when the output of the machine 6 greatly exceeds the requirements of a single group of molds 1 and 2.

The apparatus of FIGS. 4 to 6 can be modified substantially in the same way as described in connection with the apparatus of FIGS. 1 to 3. Thus, the mold 24 can convert parisons 26 into hollow blanks 30 which are thereupon converted into shaped articles 33 by resorting to two or more molds 25 which are movable to and from the station II in a predetermined sequence. Also, the apparatus of FIGS. 4–6 can employ an additional mold 24 which alternates with the illustrated mold 24 in accepting parisons from the machine 29, and an additional mold 25. The additional molds 24, 25 can be mounted mirror symmetrically to the illustrated molds 24, 25 with reference to a plane which is normal to the plane of FIG. 4, 5 or 6 and includes the axis of the machine 29.

Still further, the apparatus of FIGS. 4–6 could employ an additional blowing or calibrating unit 32 to the left of the station A and a second mold 25 movable between the second calibrating unit and a second ejecting station. The mold 24 would then move alternately to opposite sides of the station A in order to transport parisons into register with the illustrated unit 32, thereupon with the other unit 32, again with the illustrated unit 32, and so forth.

Without further analysis, the foregoing will so fully reveal the gist of the present invention that others can, by applying current knowledge, readily adapt it for various applications without ojitting features which fairly constitute essential characteristics of the generic and specific aspects of my contribution to the art and, therefore, such adaptations should and are intended to be comprehended within the meaning and range of equivalence of the claims.

I claim:

1. A method of converting parisons into hollow shaped articles, comprising the steps of forming a succession of parisons including extruding plasticized synthetic plastic material substantially vertically downwardly at a first station; transferring parisons to a second station which is laterally offset from said first station, including moving a first multisection mold whose sections are movable between open and closed positions from said second to said first station while said sections are held in open positions, closing said sections around the parison at said first station, separating the thus confined parison from material which is being extruded, and moving the first mold to said second station while said sections remain in closed positions; introducing a hollow blowing mandrel into the mold at said second station and converting the confined parison into a hollow preform by introducing a gaseous blowing medium into the parison through the hollow mandrel; moving said sections to open positions and thereupon moving the mold to said first station for reception of a fresh parison while maintaining said mandrel at said second station with the preform suspended thereon; confining the preform on said mandrel at said second station in a second multi-section mold whose sections are movable between open and closed positions independently of the sections of said first mold so that the length of the interval of confinement of the preform in said second mold can deviate from the length of the interval of confinement of the parison in said first mold, including moving the sections of said second mold to open positions at a third station which is laterally offset from said second station; moving the second mold to said second station so that the preform on said mandrel is received between the sections of said second mold and moving the sections of said second mold to closed positions; introducing into the thus confined preform a gaseous blowing medium through said mandrel to convert the preform into a shaped article; withdrawing the mandrel from the second mold at said second station while said sections of said second mold remain in closed positions; and ejecting the article from the second mold, including moving the sections of said second mold to open positions at said third station.

2. A method as defined in claim 1, wherein the movements of said first mold to and from said first station take place simultaneously with movements of said second mold to and from said second station.

3. A method as defined in claim 1, wherein the dimensions of said preform deviate only slightly from the dimensions of the respective shaped article.

* * * * *